(12) United States Patent
Rossman

(10) Patent No.: US 10,484,331 B1
(45) Date of Patent: Nov. 19, 2019

(54) SECURITY APPLIANCE PROVISIONING

(71) Applicant: Amazon Technologies, Inc., Seattle, WA (US)

(72) Inventor: Hart Matthew Rossman, Vienna, VA (US)

(73) Assignee: Amazon Technologies, Inc., Seattle, WA (US)

(*) Notice: Subject to any disclaimer, the term of this patent is extended or adjusted under 35 U.S.C. 154(b) by 264 days.

(21) Appl. No.: 15/195,758

(22) Filed: Jun. 28, 2016

(51) Int. Cl.
  *H04L 29/06* (2006.01)

(52) U.S. Cl.
  CPC ...... *H04L 63/0209* (2013.01); *H04L 63/0227* (2013.01); *H04L 63/145* (2013.01); *H04L 63/1433* (2013.01); *H04L 63/1458* (2013.01); *H04L 63/1491* (2013.01); *H04L 63/20* (2013.01)

(58) Field of Classification Search
  CPC .... H04L 63/20; H04L 63/102; G06F 21/6218
  USPC .......... 726/1
  See application file for complete search history.

(56) References Cited

U.S. PATENT DOCUMENTS

| | | | | |
|---|---|---|---|---|
| 2009/0328193 A1* | 12/2009 | Moore | ..................... | G06F 21/53 726/15 |
| 2015/0033282 A1* | 1/2015 | O'Hern | .................. | H04L 63/20 726/1 |
| 2017/0359217 A1* | 12/2017 | Ahuja | ................. | H04L 67/1031 |

* cited by examiner

*Primary Examiner* — Evans Desrosiers
(74) *Attorney, Agent, or Firm* — Thorpe North & Western, LLP

(57) ABSTRACT

A technology is provided for security appliance provisioning. In one example, a method includes providing a variety of types of physical security appliances in a service provider environment. A selection may be received identifying a selected security appliance from among the variety of types of physical security appliances for use in a customer virtual infrastructure within the service provider environment. The selected security appliance may be provisioned for use at an edge location of the customer virtual infrastructure. The selected security appliance may be configured to enforce a security policy defined for the customer virtual infrastructure.

20 Claims, 7 Drawing Sheets

SECURITY APPLIANCE PROVISIONING

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public wide area networks). For example, data centers housing significant numbers of interconnected computing systems have become commonplace. Such data centers may be private data centers that are operated by and on behalf of a single organization or public data centers that are operated by entities as businesses to provide computing resources to customers. Some public data center operators provide network access, power, and secure installation facilities for the hardware owned by various customers, while other public data center operators provide "full service" facilities that also include hardware resources made available for use by their customers (e.g., virtualized computing).

Virtualization technologies for computing services have provided benefits with respect to managing large-scale computing resources for many customers with diverse needs, allowing various computing resources to be efficiently and securely shared by multiple customers. For example, virtualization technologies may allow a single physical computing machine to be shared among multiple users by providing each user with one or more virtual machines hosted by the single physical computing machine, with each such virtual machine being a software simulation acting as a distinct logical computing system that provides users with the illusion that they are the sole operators and administrators of a given hardware computing resource, while also providing application isolation and security among the various virtual machines. Furthermore, some virtualization technologies are capable of providing virtual resources that span two or more physical resources, such as a single virtual machine with multiple virtual processors that spans multiple distinct physical computing systems.

The security of computing resources and associated data is of high importance in many contexts, including virtualized computing. As an example, organizations often utilize networks of computing devices to provide a robust set of services to their users. Networks often span multiple geographic boundaries and connect with other networks. An organization, for example, may support its operations using both internal networks of computing resources and computing resources managed by others. Computers of the organization, for instance, may communicate with computers of other organizations to access and/or provide data while using services of another organization. With many complex uses of computing resources to manage, ensuring that access to the data is authorized and generally that the data is secure can be challenging, especially as the size and complexity of such configurations grow.

DETAILED DESCRIPTION

Technology is provided for security appliance provisioning. In one example, a method includes providing a variety of separate types of physical security appliances in a service provider environment. A selection may be received identifying a selected security appliance from among the variety of types of physical security appliances for use in a customer virtual infrastructure within the service provider environment. The selected security appliance may be provisioned for use at an edge location of the customer virtual infrastructure within the service provider environment. The selected security appliance may be configured to enforce a security policy defined for the customer virtual infrastructure.

In a more specific example, a method for security appliance provisioning is provided. The method may include providing a variety of types of physical security appliances in a service provider environment. A request may be received for a list of the variety of types of physical security appliances in a service provider environment meeting criteria defined in the request. A selection may be received identifying a selected security appliance from among the variety of types of physical security appliances for use in a customer virtual infrastructure within the service provider environment. Configuration instructions may be received to configure the selected security appliance, and the configuration instructions may include a security policy defined for the customer virtual infrastructure. The selected security appliance may be provisioned at an edge location of the customer virtual infrastructure (e.g., an edge of the customer's virtual network) based on the configuration instructions. The selected security appliance may be configured to enforce the security policy.

The present technology may enable customers to provision physical security appliances, choose a packet path, manage a configuration of security appliances, etc. in an any-to-any configuration scenario between service provider environment resources or between on-premise constructs and networked constructs in the service provider environment or elsewhere. The present technology may also enable hardware accelerated options for security appliances and may run security appliances in a physical production network as opposed to a customer virtual environment in order to provide a smaller attack surface. The provisioning, configuring, and other management of the security appliances may be done through APIs (Application Programming Interfaces) to enable an elastic border security service.

Figure 1:
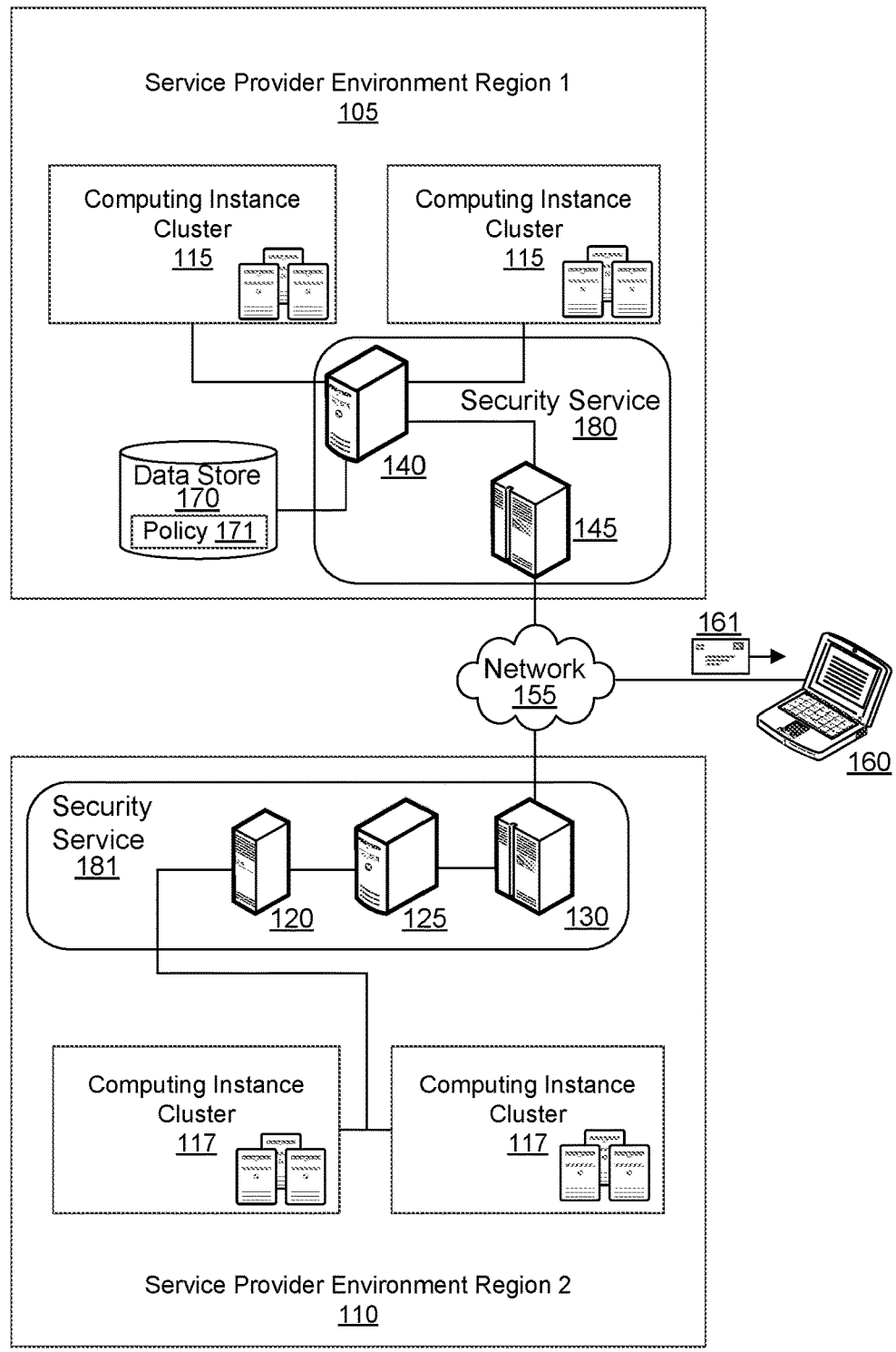
FIG. 1 is a diagram illustrating an example system of provisioned physical security appliances in a service provider environment.

FIG. 1 is a diagram illustrating a high level example of a system for security appliance provisioning. Specifically, the system may be a service provider cross-region or cross-zone elastic defense service (see security service 180, 181) that allows for the provisioning, configuration, and orchestration of security appliances 120, 125, 130, 140, 145 and applications as well as the management of network traffic to accommodate packets and workloads that will be protected. Customers using existing technologies lack the ability to provision network appliances from a range of hardware security appliance types. Customers using conventional technologies also lack the ability to provision and configure security gateways between service provider regions or areas, VPCs (Virtual Private Clouds), at an internet gateway or virtual private gateway.

The security service 180, 181 allows the customer to provision a custom security gateway for inter-region or inter-network communication. In one example, customers using a client device 160 and connected over a network 155 may select one or more physical/hardware security appliances 120, 125, 130, 140, 145 which will be virtually connected via packet paths. In another example, a customer may select one or more virtual appliances which may be connected via packet paths. In a third example, a customer may select from a "farm" or group of security devices with shared/multi-tenant access and packet paths (e.g. a security device farm). The customer may have the option of mixing the provisioning of certain hardware appliances with certain virtual appliances or integration with other service provider services, such as services to assesses applications for vulnerabilities or deviations from best practices, to manage encryption keys, to monitor regulatory compliance, etc. Security appliances 120, 125, 130, 140, 145 may perform dedicated security functions such as network encryption (bulk tunnels or TLS (Transport Layer Security)), IDS (Intrusion Detection System), IPS (Intrusion Prevention System), anti-DDOS (Distributed Denial of Service), anti-malware, honeynet or honeypot, fuzzing, static/dynamic code analysis, vulnerability checking, signature validation, forensics lab, etc. These security appliances may run service provider-developed security software, open source software, or partner solutions.

There are many existing security appliances in hardware or software (e.g., a software firewall on a computer or a specialized firewall installed on a purpose built security appliance). As various computing services move to networked solutions (e.g., the "cloud"), customers desire the availability of existing solutions within service provider environments. However, service provider environments typically provide virtualization technologies where physical hardware is not made available to customers but rather hardware is virtualized in the service provider environment. Also, as a result customers may find it difficult to model hardware in the service provider environment or to find solutions similar to local hardware options to use in the virtual environment.

The present technology enables customers to use hardware security appliances at network edges in the virtual environment. The present technology may enable customers to test the security of various hardware solutions in the service provider environment without the cost and effort of purchasing and installing a local security appliance. In some example service provider environments, the security appliance may be provisioned for use between VPCs, between availability zones, or between geographic regions. Each geographic region may contain multiple distinct locations called availability zones (e.g., buildings with physical computing assets). Each availability zone may be engineered to be isolated from failures in other availability zones and to provide inexpensive, low-latency network connectivity to other zones in the same region. Launching computing instances in separate availability zones enables customers to protect applications from the failure of a single location.

The present technology enables customers to make changes to a security stack or to replicate a security stack (e.g., multiple security appliances in a sequence or series) in the service provider environment and to monitor and evaluate the performance, and may thus avoid potentially negative effects of testing such changes on a local production network.

Conventionally, customers lack options for defining policy enforcement points in a virtual environment or service provider environment. For example, the customer may be unable to install a firewall between two identified regions. The customer may use security groups, but security groups do not provide the same performance or benefits as security appliances. A security group may act as a virtual firewall for a computing instance to control inbound and outbound traffic. Security groups act at the computing instance level. For each security group, inbound rules are defined to control the inbound traffic to computing instances, and a separate set of outbound rules are defined that control the outbound traffic. The present technology enables customers to define policy enforcement points. For example, FIG. 1 illustrates a number of network components, such as computing instance clusters within service provider environment regions, where the computing instance clusters may be virtualized. FIG. 1 also illustrates a number of security appliances 120, 125, 130, 140, 145 which may be hardware or physical security appliances that are not virtualized. The service provider may use a device pool to provide security solutions between borders or edges in the service provider environment. For example, in Service Provider Environment Region 1 105, a security appliance 140 is positioned to manage the security of traffic between computing instance clusters 115 or between a computing instance cluster 115 and the data store 170. The data store 170 may store any type of data, and may store a security policy 171 for use by the security appliances in the system. A second security appliance 145 may manage the security for traffic leaving the service provider environment region 1 105. In Service Provider Environment Region 2 110, the customer has not provisioned a security appliance for traffic between the computing instance clusters 117, but has provisioned a plurality of the security appliances 120, 125, 130 for traffic leaving the region 110.

Any one or more security appliances may be provisioned in any desired configuration to direct network traffic through the security appliances in a specified order. For example, security appliances may provide network firewalling, web application firewalling, intrusion detection, anti-malware, data loss prevention, message gateway security, and so forth. In one example, a first VPC may handle PCI (Payment Card Industry) content and a second VPC may disallow PCI content. A message gateway may enable filtering of messages to ensure that PCI content is not transmitted to the second VPC.

In addition to providing security for traffic entering or leaving an internet gateway or customer gateway as shown in Service Provider Environment Region 2, the present technology enables provisioning of security appliances at borders or edges of a private network within the service provider environment that are not necessarily connected to the internet, such as the security appliance between computing instance clusters in Service Provider Environment Region 1.

To a customer, the security appliance may appear to be and function as if it were part of the virtualized network. However, the security appliance may be a physical appliance in a physical production environment supporting the virtual service provider environment. Because the security appliance is not directly accessible, an additional layer of security is provided where a large number of current attack vectors become invalid. For example, if the security appliance were not implemented separately, then when a computing instance is compromised, any software executing on the computing instance is also available to the attacker.

The security service 180, 181 may provide a notification 161 to a customer at client device 160. For example, one type of feedback or notification 161 may be an indication of the success or failure or provisioning the requested security appliance. Another notification 161 example may be security related. The notification may be an escalation of a detected security issue to an event manager to an enterprise security administrator or the like. The interface (e.g., API) of the security service 180, 181 may enable remote management of the security service 180, 181 to address provisioning success/failure matters, security issues, definition of security policies, etc. The notifications may be emails, texts, instant messages, console notifications, or other electronic messaging which a customer may set up.

Figure 2:
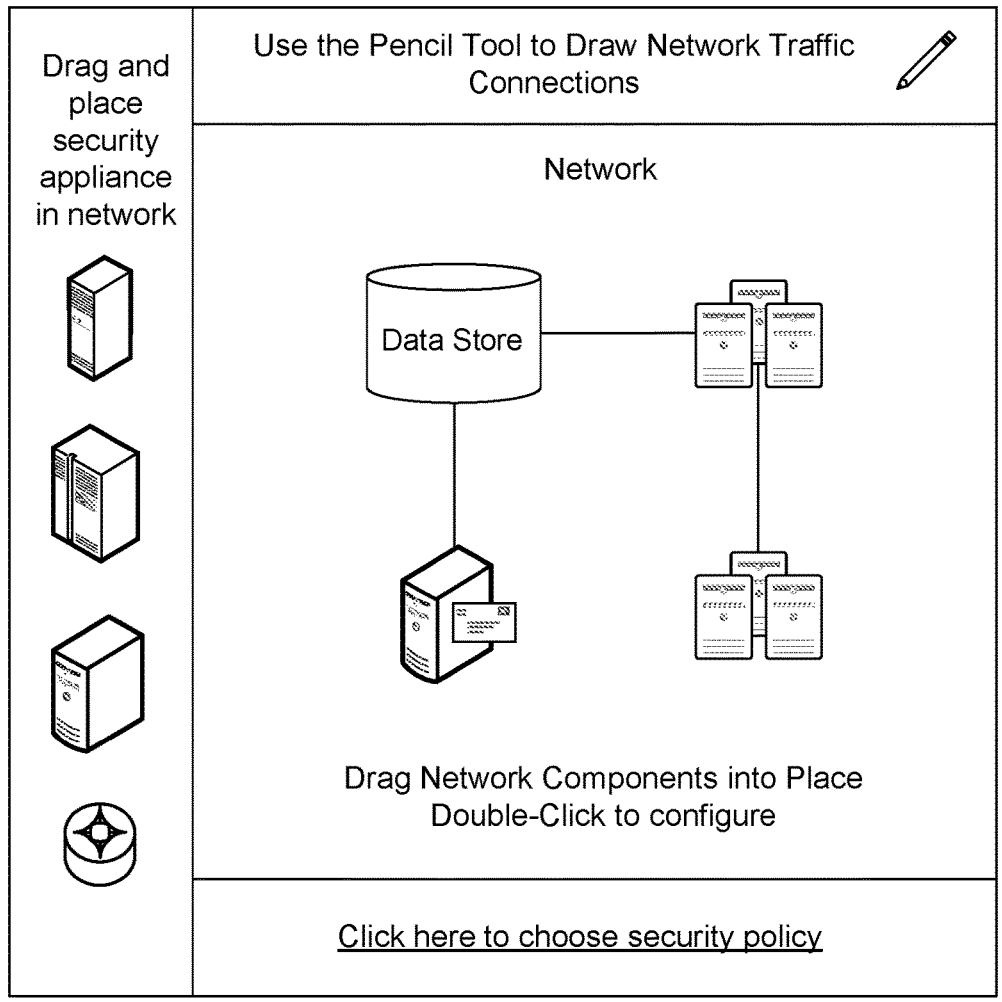
FIG. 2 illustrates a graphical user interface for configuring security appliances in an example.

The technology may provide a generalized environment that enables customers to define security rules and select desired security appliances. In other words, rather than rely on security software available from the service provider or a third party, the customer may select purpose built security hardware or purpose built security ASICs (Applicant Specific Integrated Circuits) with custom defined security rules or policies. The security appliances may be available on-demand and elastically available. The security appliances may be configurable via an API and may be provisioned remotely. As will be described in additional detail with respect to FIG. 2, the technology enables moving the security appliance to different edge locations via API.

A service provider service enabling the use of physical security appliances with virtualized technologies may provide high availability and continuity of operations. Customers may provision clusters or groupings of security appliances for protection, for fail-over, or other purposes. For example, if a customer fails over to another region, also failing over the perimeter protection to the other region may be valuable to the customer. As another example, if a firewall is implemented locally and the system fails over to the service provider, the service provider may provide a same firewall using the service provider firewall security appliance and a rule set provided by the customer. If something goes wrong and a customer loses power on premise and fails over to the service provider, the service provider may provide the security service essentially immediately without the customer attempting to implement a security solution at the last minute via software.

From the customer's perspective, these security appliances (hardware or virtual) may be provisioned elastically at edge locations of a network within their virtual infrastructure. For example, the security appliances may be provisioned between service provider regions, at an internet gateway, at a communications gateway, etc. Part of the provisioning may include establishing routes by VPC, subnet, elastic network interface or the like to ensure traffic is correctly sent to the security appliance. A security pipeline manager, illustrated as a graphical user interface in FIG. 2, allows for drag and drop selection of security functionality and the order in which provisioned appliances are traversed by packets. This graphical user interface may be API driven and user configurable to augment default settings. The graphical user interface may provide workflow management, selection of packet paths including treating the security appliance as a serial gateway of appliances, parallel packets paths of appliances (context sensitive), or a trombone (packets are routed in a loop through the appliances; either back to source or out through another gateway). The system may provide logging, monitoring, and alerting/escalation from the security appliance.

The system may provide the customer with modeling and simulation of the packets traversal of the selected security appliances. For example, the system may model a series of use cases of packet paths and estimate characteristics such as latency, inspection coverage, throughput based on security appliances selected, security appliance configuration, and so forth. The system may also enable the user to send a short burst of packets through the service to validate the model quickly or provide a higher confidence of the configuration prior to deployment.

Using a web console or API, a customer may provision a selected security appliance, select hardware acceleration options for the security appliance, and configured the security appliance. The customer may use the drag and drop interface to choose where to deploy or provision the security appliance and may provision the security appliance between any desired connections. The customer may also define security rules or select a default or preconfigured set of rules to implement a security policy. Failing to define security rules or select a predefined set of rules may result in all packets being denied as none are expressly permitted.

A customer may test throughput or performance after configuring the security appliance. For example, a customer may provision security appliances such as a data loss prevention (DLP) appliance and an intrusion detection system (IDS) between VPCs. The configuration may provide 100 ms throughput. The customer may remove the DLP and achieve a 5 ms throughput. The customer may test and validate a rule set and performance to anticipate bottlenecks, points of friction, where toolsets may be optimized, etc. The customer may modify the order in which traffic traverses the security appliance to achieve the desired performance. For cross region security solutions, the security appliance may be provisioned in two or more regions.

Figure 3:
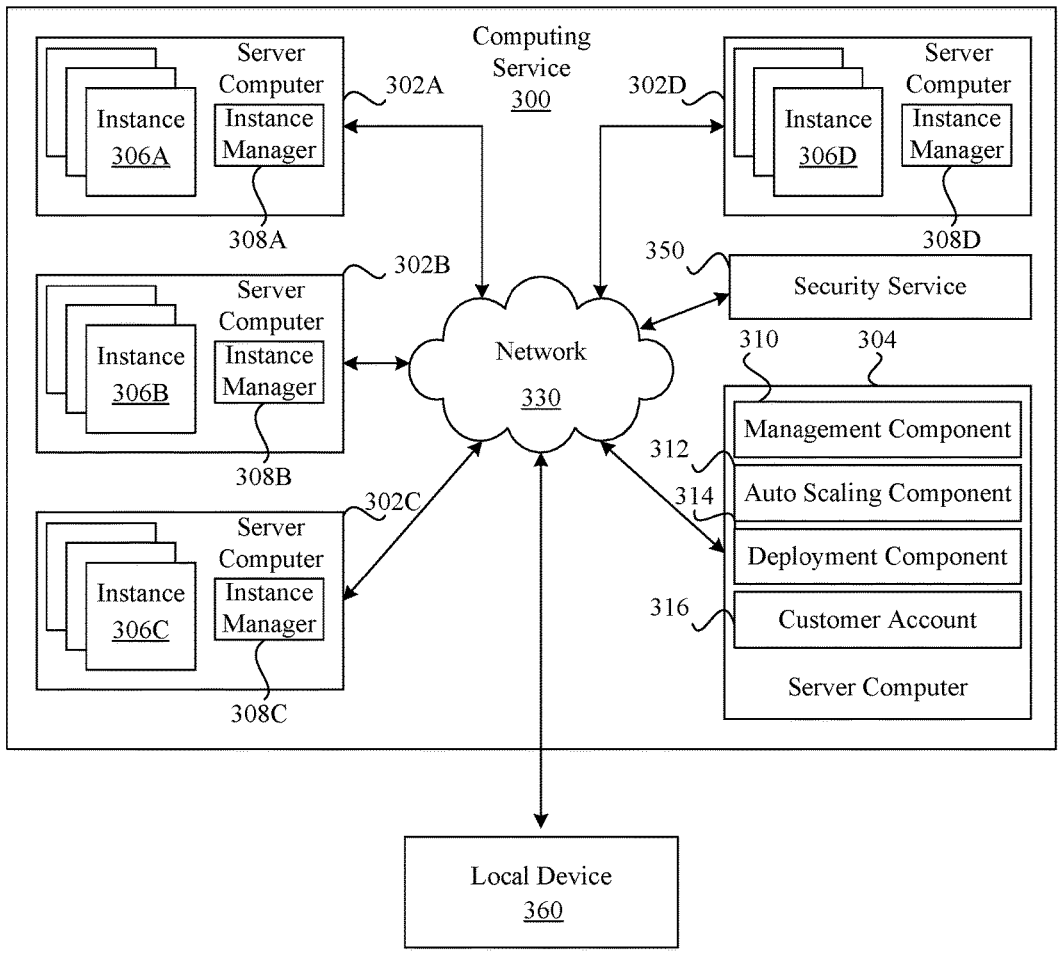
FIG. 3 is a diagram that illustrates an example of a computing service having a security service in an example of the security appliance technology.

The security appliance provisioning technology using the methods or aspects described may be executed or maintained in a data center or service provider environment for a computing service provider. FIG. 3 illustrates how components of a data center may function as a computing service 300 in a service provider environment to provide a platform for computing instances which the present technology may use to execute nodes as described. The computing service 300 (i.e., the cloud provider or service provider) may be capable of delivery of computing and storage capacity as a service to a community of end recipients. In an example implementation, the computing service may be established for an organization by or on behalf of the organization. That is, the computing service 300 may offer a "private cloud environment." In another implementation, the computing service 300 may support a multi-tenant environment, wherein a plurality of customers operate independently (i.e., a public cloud environment). Generally speaking, the computing service 300 can provide the following models: Infrastructure as a Service ("IaaS"), Platform as a Service ("PaaS"), and/or Software as a Service ("SaaS"). Other models may also be provided. In some implementations, end users access the computing service 300 using networked client devices, such as desktop computers, laptops, tablets, smartphones, etc. running web browsers or other lightweight client applications. Those skilled in the art will recognize that the computing service 300 can be described as a "cloud" environment.

The particularly illustrated computing service 300 may include a plurality of server computers 302A-302D. While four server computers are shown, any number may be used, and large centers may include thousands of server computers. The server computers 302A-302D may provide computing resources for executing software instances 306A-306D. In one implementation, the instances 306A-306D may be virtual machines. A virtual machine may be an instance of a software implementation of a machine (i.e. a computer) that executes applications like a physical machine. In the example of virtual machine, each of the servers 302A-302D may be configured to execute an instance manager 308 capable of executing the instances. The instance manager 308 may be a hypervisor or another type of program configured to enable the execution of multiple instances 306 on a single server. Additionally, each of the instances 306 may be configured to execute one or more applications.

It should be appreciated that although the implementations disclosed herein are described primarily in the context of virtual machines, other types of instances can be utilized with the concepts and technologies disclosed herein. For instance, the technologies disclosed herein can be utilized with storage resources, data communications resources, and with other types of computing resources. The implementations disclosed herein might also execute all or a portion of an application directly on a computer system without utilizing virtual machine instances.

One or more server computers 304 may be reserved for executing software components for managing the operation of the server computers 302 and the instances 306. For example, the server computer 304 may execute a management component 310. A customer may access the management component 310 to configure various aspects of the operation of the instances 306 purchased by the customer (i.e., the administrator of a service to be executed using the instances and made available to traffic from client devices). For example, the customer may purchase, rent or lease instances and make changes to the configuration of the instances. The customer may also specify settings regarding how the purchased instances are to be scaled in response to demand. An auto scaling component 312 may scale the instances 306 vertically or horizontally based upon rules defined by the customer. In one implementation, the auto scaling component 312 allows a customer to specify scale-up policies for use in determining when new instances should be instantiated, including what type of instance to instantiate, and scale-down policies for use in determining when existing instances should be terminated. The auto scaling component 312 may consist of a number of sub-components executing on different server computers 302 or other computing devices. The auto scaling component 312 may monitor available computing resources over an internal management network and modify resources available based on predictions of need as well as based on actual need.

A deployment component 314 may be used to assist customers in the deployment of new instances 306 of computing resources. The deployment component 314 may have access to account information associated with the instances, such as who is the owner of the account, credit card information, country of the owner, etc. The deployment component 314 may receive a configuration from a customer that includes data describing how new instances 306 should be configured. For example, the configuration may specify one or more applications to be installed in new instances 306, provide scripts and/or other types of code to be executed for configuring new instances 306, provide cache logic specifying how an application cache should be prepared, and other types of information. The deployment component 314 may utilize the customer-provided configuration and cache logic to configure, prime, and launch new instances 306. The configuration, cache logic, and other information may be specified by a customer using the management component 310 or by providing this information directly to the deployment component 314.

Customer account information 316 may include any desired information associated with a customer of the multi-tenant environment. For example, the customer account information can include a unique identifier for a customer, a customer address, billing information, licensing information, customization parameters for launching instances, scheduling information, auto-scaling parameters, previous IP addresses used to access the account, etc. Information such as the unique identifier, IP addresses used to access the account and so forth may be used in authenticating a user to the service provider environment.

The computing service 300 may be used to host or provide any number of potential services to customers, such as storage, compute, or other services. In one example, a security service 350 may be provided for managing and provisioning security appliances in the service provider environment. In one example, the security service 350 may be hosted on one or more of the server computers 302A-302D rather than being separate from these server computers 302A-302D as illustrated.

A network 330 may be utilized to interconnect the server computers 302A-302D and the server computer 304. The network 330 may be a local area network (LAN) and may be connected to a Wide Area Network (WAN) 340 so that end users may access the computing service 300. It should be appreciated that the network topology illustrated in FIG. 3 has been simplified and that many more networks and networking devices may be utilized to interconnect the various computing systems disclosed herein.

Figure 4:
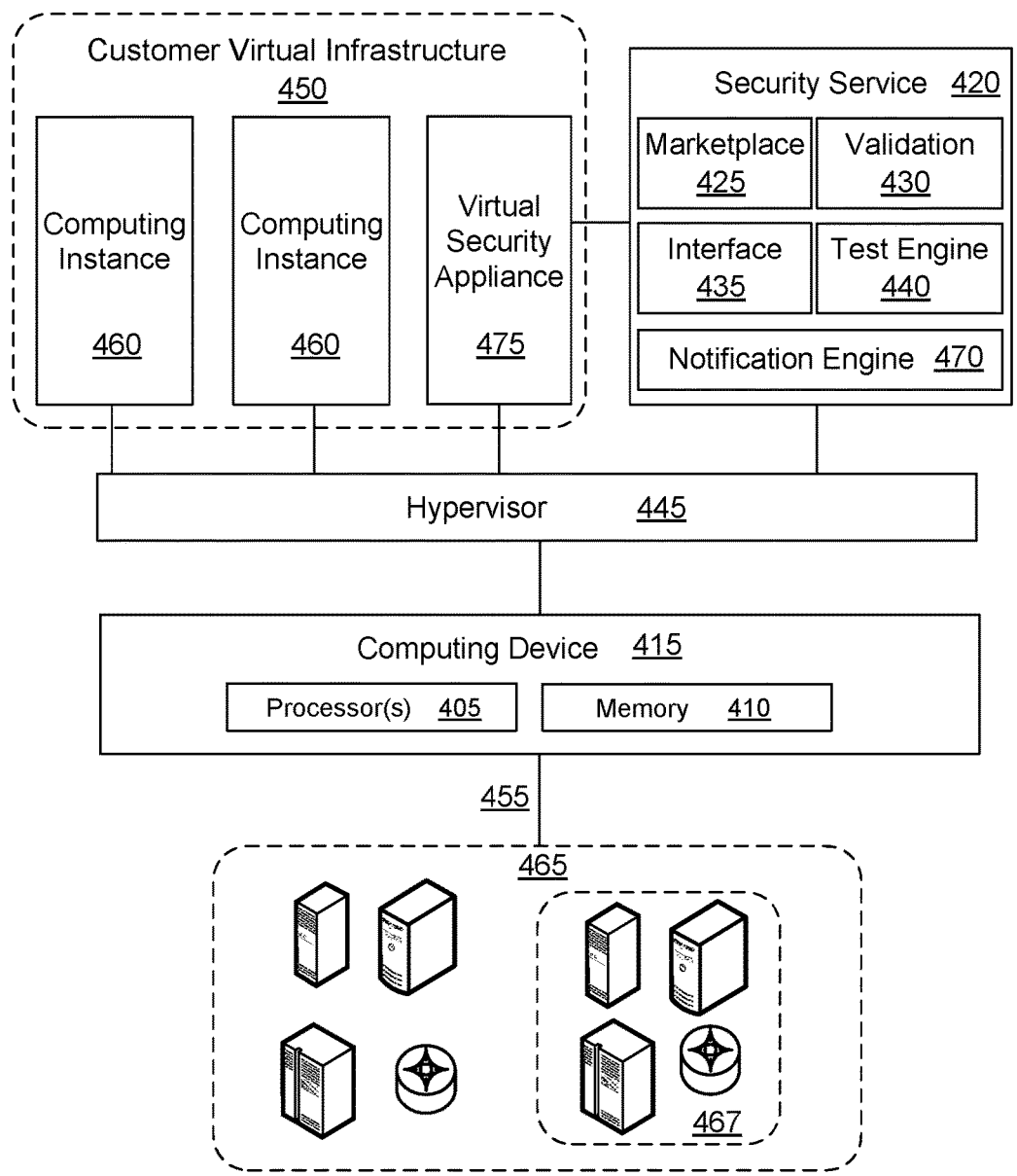
FIG. 4 is a block diagram illustrating a security appliance system in an example of the technology.

Referring now to FIG. 4, a block diagram of a system in a service provider environment for security appliance provisioning and management is illustrated in accordance with an example of the present technology. The system elements may be implemented using one or more computing devices in a service provider environment, such as a security server or security service 420 as an example computing device, as well as client devices which may be external to the service provider environment, and may be accessed across a network 455. The system may include one or more data stores and a number of modules or services as part of a security appliance provisioning service.

A customer virtual infrastructure 450 may include one or more virtual computing instances 460 implemented using a virtualization computing environment in a service provider environment, which may include a virtual distributed computing system with a virtualization layer executing on a hardware substrate layer. The hardware layer may include a plurality of physical computers (e.g., computing device 415), servers, processing nodes, security appliances 465 and the like. The virtualization layer (e.g., hypervisors 445 and virtualization control plane) may provide platforms on which virtual computing instances 460 may be created. In other words, the virtual computing instances 460 may execute on the hardware layer by using the platform provided by the virtualization layer. This computing service architecture that supports computing instances is illustrated in more detail in FIG. 3.

The system may include a variety of types of physical security appliances 465 in the service provider environment.

The computing device 415 may represent a plurality of computing devices in the service provider environment. A customer virtual infrastructure 450 may execute in the service provider environment on the computing device(s) 415. A security service 420 may provide a marketplace 425. The marketplace 425 may be a digital marketplace to market the variety of types of physical security appliances 465. The marketplace 425 may be configured to receive a selection identifying a selected security appliance from among the variety of types of physical security appliances 465 for use in the customer virtual infrastructure 450. The system may include a physical network 455 connecting the customer virtual infrastructure 450 via the computing device(s) 415 to the selected security appliance(s) 465.

The security service 420 may further provide an interface 435 to enable provisioning the selected security appliance 465 for use at an edge location of the customer virtual infrastructure 450. In one example, the edge location may be a customer edge that interfaces on two sides (e.g., inbound and outbound going in both directions) by the service provider environment. Alternatively, the edge location may interface on one side with the service provider environment and on the other side with the internet or a private network. The interface 435 may further enable configuration of the selected security appliance 465 to enforce a security policy defined for the customer virtual infrastructure 450. The interface may be an API, a GUI or any other suitable type of interface, or combinations thereof.

A validation engine 430 may be configured to send a short burst of packets across the physical network 455 through the selected security appliance 465 to validate the selection and the security policy prior to deployment in the customer virtual infrastructure 450 in order to model performance of the selected security appliance 465 and the suitability of the selected security appliance 465 for the intended purpose.

The security service 420 may also provide a test engine 440 configured to virtualize the selected security appliance and estimate a performance of the selected security appliance in the customer virtual infrastructure.

The test engine 440 may enable a security appliance farm or a test farm 467. Conventionally, customers are unable to test a variety of security solutions against applications without significant expense. Acquiring a security appliance, configuring the security appliance, testing the security appliance and many other operations can be expensive and time consuming, with an end result that the security appliance may be determined to be inappropriate for the intended use. Further, reconfiguring the conventional security appliance implementation for different configurations or packet paths may involve a lot of work and time. The present technology enables a customer to have access to, for example, any of the top 50 or 100 security appliances and rapidly test different appliances or configurations in a variety of scenarios without having to own or operate any of the security appliances involved. The configurations and deployments may be easily and rapidly modified via graphical user interface. If a problem is detected, such as when it is suspected that a firewall is a problem but three different firewalls are being used, determining the source of the problem may be difficult. However, a security appliance farm enables easy modification to test appliances and configurations to identify the problem. In another example, the customer may arrange security appliances and define a packet path and policy and the security service 420 may produce a burst of packets to generate data that shows how typical types of traffic perform in that solution. The security service may quickly estimate how packets will pass through the defined solution without having to actually provision infrastructure.

Security may involve geographic-specific policies such as relating to data sovereignty and export control, for example. As a specific example, the United States may be restricted from exporting cryptography to Russia, and Russia may allow some cryptography within Russian borders. The validation engine 430 may validate whether data is Russia-approved, for example. The marketplace 425 may identify Russia-approved security appliances and policies that may be used in a Russia region.

The marketplace 425 may analyze packets in many of configurations over time and use machine learning to make suggestions of security appliances and policies. In one example, the marketplace 425 may use pattern matching to make recommendations of a particular configuration of border security solutions, such as to suggest whether the configuration is inefficient or not recommended, or whether selected brands are incompatible, etc. Also, the customer may define via the interface 435 a desired latency, attacks to prevent against, etc. and the marketplace 425 may recommend a security stack to provision or test in a device farm.

The security service 420 may include a notification engine 470. The notification engine may provide feedback or notifications to a customer. For example, one type of feedback or notification may be an indication of the success or failure or provisioning the requested security appliance. Another notification example may be security related. The notification may be an escalation of a detected security issue to an event manager to an enterprise security administrator or the like. The interface 435 (e.g., API) of the security service 420 may enable remote management of the security service 420 to address provisioning success/failure matters, security issues, definition of security policies, etc. as may be raised through the notification engine 470.

In addition to enabling the provisioning of physical security appliances 465, the security service 420 may enable provisioning of one or more virtual security appliances 475. The marketplace 425 may enable customers to select whether to provision a physical or a virtual security appliance, which may be configured via the interface 435. The virtual security appliance 475 may be scalable by adding additional virtual security appliances or physical security appliances just as a physical security appliance may be scalable by adding physical or virtual security appliances. The virtual security appliance may be specialized to function as a firewall, a gateway, NAT (network address translation) server, or any other suitable type of security appliance.

Client devices may be available to access and interact with the security service 420 in a computing service provider environment or one or more computing instances 460 or clusters, over a network. Example client devices may include, but are not limited to, a desktop computer, a laptop, a tablet, a mobile device, a television, a cell phone, a smart phone, a hand held messaging device, heads up display (HUD) glasses or any device with a display that may receive and present the message content.

A service provider environment may be implemented across one or more computing device(s) 415 connected to a network. For example, a computing device 415 may include a data store and various engines and/or modules such as those described above and such modules may be executable by a processor 405 of the computing device 415. The system may be implemented as a plurality of computing nodes or computing instances 460, each of which comprises at least one processor and a memory, where the computing nodes are configured to collectively implement the modules, data stores and so forth.

The modules that have been described may be stored on, accessed by, accessed through, or executed by a computing device. The computing device may comprise, for example, one or more processors 405 and one or more memory modules 410. The computing device may comprise, for example, a server computer or any other system providing computing capability. Alternatively, a plurality of computing devices may be employed that are arranged, for example, in one or more server banks, blade servers or other arrangements. For example, a plurality of computing devices together may comprise a clustered computing resource, a grid computing resource, and/or any other distributed computing arrangement. Such computing devices may be located in a single installation or may be distributed among many different geographical locations. For purposes of convenience, the computing device is referred to herein in the singular form. Even though the computing device is referred to in the singular form, however, it is understood that a plurality of computing devices may be employed in the various arrangements described above.

Various applications and/or other functionality may be executed in the computing device according to various implementations, which applications and/or functionality may be represented at least in part by the modules that have been described. Also, various data may be stored in a data store that is accessible to the computing device. The data store may be representative of a plurality of data stores as may be appreciated. The data stored in the data store, for example, may be associated with the operation of the various modules, applications and/or functional entities described. The components executed on the computing device may include the modules described, as well as various other applications, services, processes, systems, engines or functionality not discussed in detail herein.

Certain processing modules may be discussed in connection with this technology. In one example configuration, a module may be considered a service with one or more processes executing on a server or other computer hardware. Such services may be centrally hosted functionality or a service application that may receive requests and provide output to other services or customer devices. For example, modules providing services may be considered on-demand computing that is hosted in a server, cloud, grid or cluster computing system. An application program interface (API) may be provided for each module to enable a second module to send requests to and receive output from the first module. Such APIs may also allow third parties to interface with the module and make requests and receive output from the modules.

Figure 5:
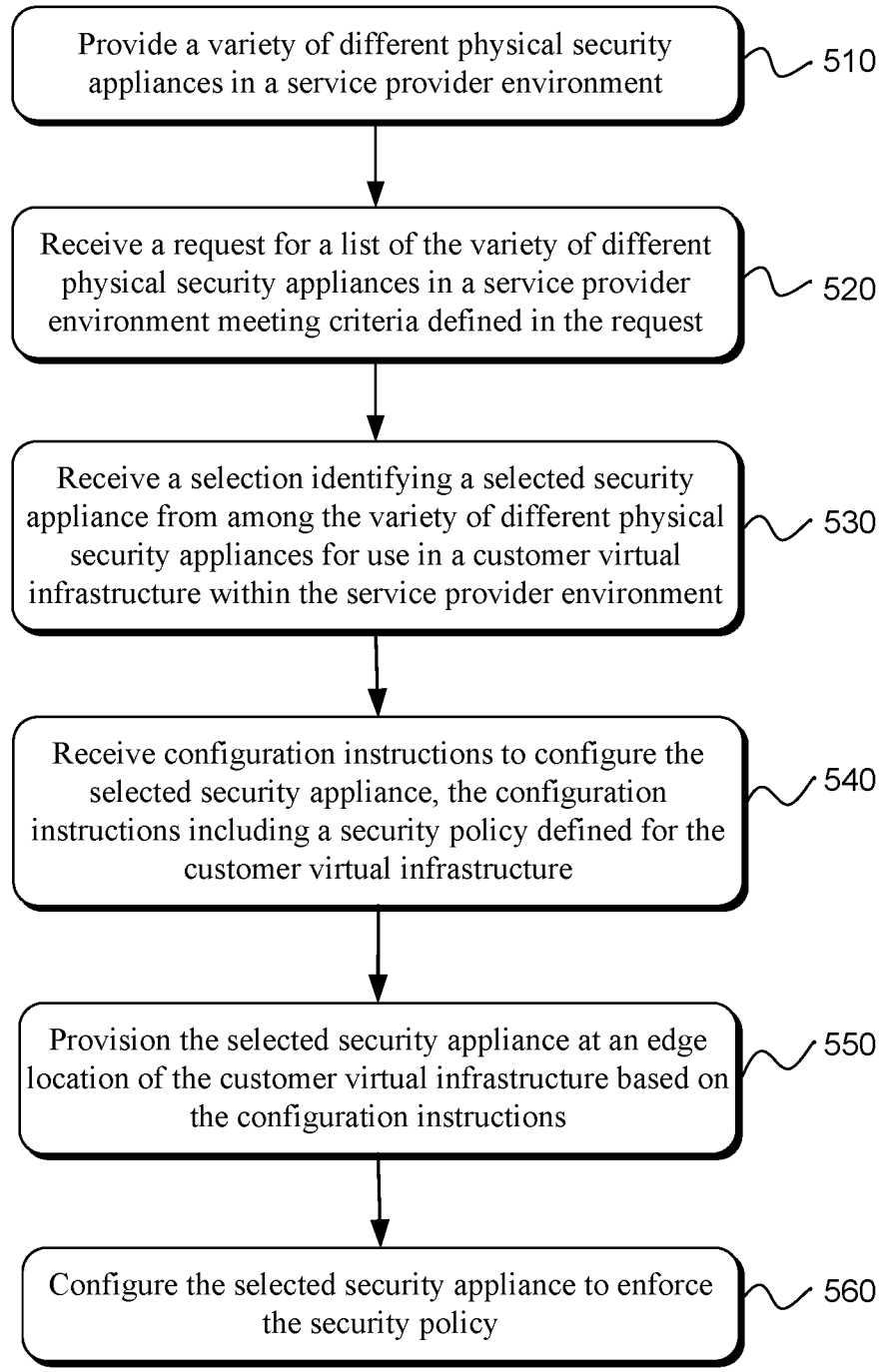
FIGS. 5-6 are flowchart diagrams that illustrate example methods for provisioning security appliances.
Figure 6:
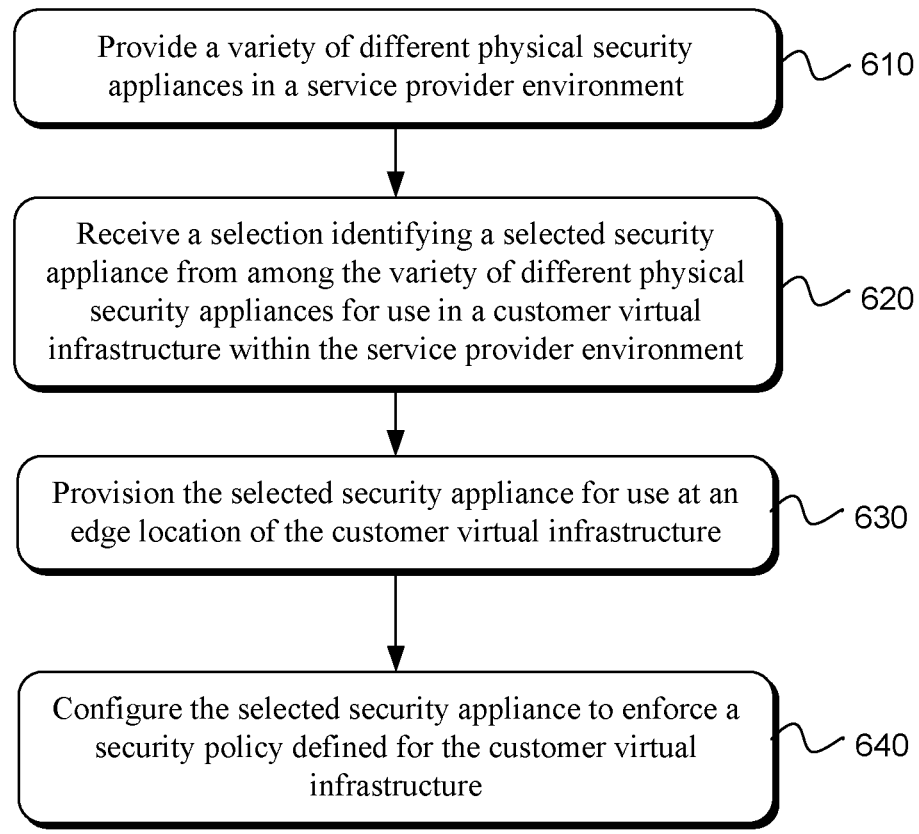

FIGS. 5-6 illustrate flow diagrams of methods according to the present technology. For simplicity of explanation, the method is depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

Any of a variety of other process implementations which would occur to one of ordinary skill in the art, including but not limited to variations or modifications to the process implementations described herein, are also considered to be within the scope of this disclosure.

Referring now to FIG. 5, a flow diagram of a method is illustrated for security appliance provisioning. The method may include providing 510 a variety of types of physical security appliances in a service provider environment. A request may be received 520 for a list of the variety of types of physical security appliances in a service provider environment meeting criteria defined in the request. A selection may be received 530 identifying a selected security appliance from among the variety of types of physical security appliances for use in a customer virtual infrastructure within the service provider environment. Configuration instructions may be received 540 to configure the selected security appliance, the configuration instructions including a security policy defined for the customer virtual infrastructure. The selected security appliance may be provisioned 550 at an edge location of the customer virtual infrastructure based on the configuration instructions. The selected security appliance may be configured 560 to enforce the security policy.

In one example, the edge location may be between geographic service provider regions. In another example, the edge location may be between virtual computing instances in the customer virtual infrastructure. The selected security appliance may be a network firewall, an application firewall, an intrusion detector, an anti-malware system, a data loss prevention system, a message gateway, or any other suitable security appliance selected to provide the desired security at the desired edge location.

The method may also include receiving a second selection of a second security appliance and provisioning the second security appliance for use in the customer virtual infrastructure. In this example, a graphical user interface may be provided to enable receipt of the configuration instructions. The graphical user interface may also enable dragging and dropping graphical representations or icons of the selected security appliance and the second security appliance relative to other components of the customer virtual infrastructure to alter network traffic flow through the selected security appliance and the second security appliance. Once a desired configuration or traffic flow has been configured, the method may alter the network traffic flow in response to the configuration instructions received through the graphical user interface.

In some examples, this or other methods described herein may be implemented wholly or partially as computer readable program code executed by a processor and the computer readable code may be embodied on a non-transitory computer usable medium.

Referring now to FIG. 6, a flow diagram is illustrated for a security appliance provisioning method. In this example, the method may method include providing 610 a variety of types of physical security appliances in a service provider environment. A selection may be received 620 identifying a selected security appliance from among the variety of types of physical security appliances for use in a customer virtual infrastructure within the service provider environment. For example, the selected security appliance may be hardware in a physical production network underlying the customer virtual infrastructure. The selected security appliance may be provisioned 630 for use at an edge location of the customer virtual infrastructure. The selected security appliance may be configured 640 to enforce a security policy defined for the customer virtual infrastructure.

In one example, the method may include moving the selected security appliance to a second edge location in a network topology of the customer virtual infrastructure based on configuration instructions while maintaining a physical location of the selected security appliance. For example, a graphical user interface may be provided that enables a user to graphically rearrange network components including the selected security appliance in order to manage and direct a flow of network traffic. The selected security appliance may be moved from one edge location to another in the virtual infrastructure. This movement in the virtual infrastructure may represent the reassignment or redirection of the network traffic flow such that the traffic flows through the arrangement of network components shown in the graphical user interface. However, the physical location of the selected security appliance may remain the same because the rearrangement of network components in the virtual infrastructure does not affect the physical location of physical components underlying the virtual infrastructure.

The method may include scaling the selected security appliance to include multiple of the selected security appliance to enforce the security policy. For example, a service provider may have any number of a variety of security appliances available for use by customers. Depending on a load in the virtual infrastructure, an individual security appliance may be insufficient to meet demand. Therefore, at least a portion of at least one additional security appliance may be allocated or provisioned for use by the customer to meet the high demand and effectuate scaling of the security appliance. If the increased demand subsides, the additional security appliance may be reallocated or deprovisioned such that the customer avoids excess costs for unnecessary hardware provisioning.

In one example, the method may include provisioning a second of the selected security appliance as a failover security appliance for a different geographic region. For example, a customer production deployment runs in a primary availability zone which may be in a first geographic region. A backup clone deployment may be made ready to be launched in a different availability zone or different geographic region if the primary zone fails. This may be an affordable failover option, because the backup clone deployment is not launched or running until instructed. The customer may create a clone of the production deployment and save it as the backup deployment. If the primary zone ever fails, the backup deployment may be launched manually or automatically in the different geographic region. The estimated downtime may be, for example, about 5-10 minutes after launch of the backup deployment, plus any additional time to load an associated database. In this example, in addition to creating the backup deployment, the customer may specify that a same type of security appliance is to be made available for the backup deployment when launched. The service provider environment may make same or similar security appliances available for the different regions. The security appliances for the different regions may be physically located at the respective different regions. In this way, the customer may maintain the security provided by the selected security appliance even when failing over to another region.

In one example, provisioning comprises provisioning the selected security appliance as a multi-tenant appliance to be shared by a plurality of customers. For example, with a firewall that can support 10,000 connections/second, 5 customers each using 2,000 connections/second may share the same firewall. Multi-tenant security appliances may save cost particularly if a customer is will use a fraction of the capacity of the security appliance.

If a customer load is less than a capacity of the selected security appliance, then a remaining processing capacity of the selected security appliance may be allocated or provisioned to one or more additional customers, rending the selected security appliance a multi-tenant appliance. If one of the customer loads increases and the selected security appliance provides insufficient capacity for the increased load in combination with the load from the other customer tenants, at least a portion of the increased load may be offloaded to a second of the selected security appliances, or one or more of the other customer tenants may be shifted to a different security appliance, or at least a portion of the load may be managed by a virtual security appliance deployed or deployable in the customer virtual infrastructure.

In one example, the selected security appliance may be a plurality of security appliances each configured to manage separate security issues. In other words, a customer may select two or more security appliances each with a respective security function or specialized configuration. For example, one security appliance may be selected to provide network encryption. Another may be selected to perform vulnerability checking. Another may be selected to provide anti-malware protection. Another may be selected to provide anti-DDOS (Distributed Denial of Service) protection. Any number of other types of security may be provided by one or more additional security devices as well, such as intrusion defense systems (IDS), intrusion prevention systems (IPS), honeynet or honeypot security mechanisms, fuzzing or fuzz testing to discover coding errors and security loopholes by inputting random data, static/dynamic code analysis services, signature validation services, data forensics lab services, and so forth.

In one example, the method may include receiving selection of a desired latency or attacks against which to defend. For example, the customer may specify to defend against port scans, spoofing, man in the middle attacks, etc. In this example, the selection identifying the selected security appliance may translated to a recommendation by the service provider environment of the selected security appliance. In other words, the customer may rely on the service provider to automatically recommend a suitable security appliance to provide the desired security services for the customer's virtualized environment. Where multiple types of security appliances are available which may satisfy the customer specification, further refinement of the selected security appliance may be offered by selecting a security appliance to fit a customer budget, selecting a security appliance with fewer or greater shared tenants, selecting a security appliance with additional similar security appliances co-located together for redundancy, scaling or other purposes, etc.

The method may include scaling the physical security appliance to a virtual computing instance (i.e., virtual security appliance) rather than to another physical security appliance. For example, another physical security appliance may be unavailable or the customer may wish to reduce scaling costs and avoid scaling to additional physical security appliances. The virtual computing instance may be configured to enforce the security policy using software. In one example, the virtual computing instance may be use virtualization technologies and/or hardware acceleration technologies to simulate or virtualize the physical security appliance or to provide a similar type of security as is provided by the physical security appliance. The method may optionally also include sending a notification to a customer of the use of the virtual computing instance. For example, if the use of a virtual computing instance results in increased network traffic latency, notifying the customer of the use of the virtual computing instance may assist the customer in understanding the cause of the increased latency. Whether scaling to a physical or virtual security appliance, the ability to scale may accommodate bursts of network traffic by adding capacity to maintain a desirable latency or throughput.

In one example, the method may include providing a device farm with the variety of types of physical security appliances. The customer may be enabled to test the physical security appliances with varied configurations in the customer virtual infrastructure. Results of the test may be provided to the customer for comparison of performance of the different physical security appliances. For example, the customer may test different security appliance firmware versions, different models of security appliances, different traffic flow arrangements including multiple types of security appliances, and so forth in order to identify a security appliance or security appliance combination or configuration that suits the customer desires.

In one example, the method may include receiving configuration instructions via application programming interface (API) for configuring the selected security appliance to enforce the security policy. The API may enable the graphical user interface previously described to function to reconfigure or provision one or more security appliances or other network components.

Figure 7:
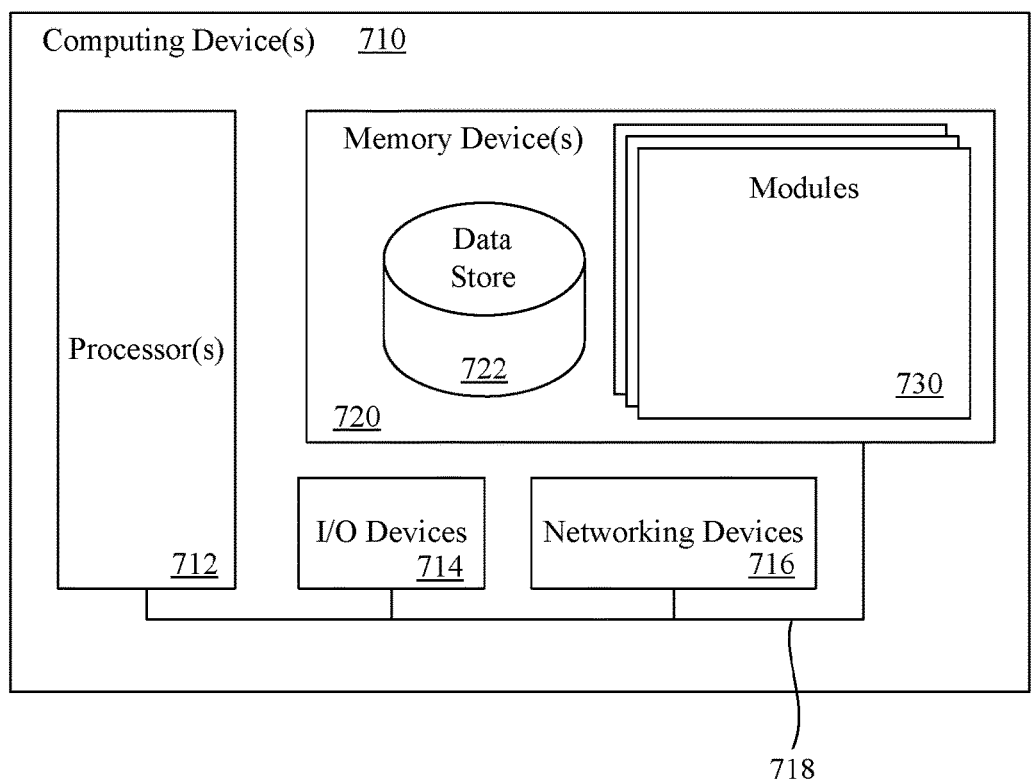
FIG. 7 is block diagram illustrating an example of a computing device that may be used to execute a method for provisioning security appliances within a networked environment.

FIG. 7 illustrates a computing device 710 on which services or modules of this technology may execute. A computing device 710 is illustrated on which a high level example of the technology may be executed. The computing device 710 may include one or more processors 712 that are in communication with memory devices 720. The computing device 710 may include a local communication interface 718 for the components in the computing device. For example, the local communication interface 718 may be a local data bus and/or any related address or control busses as may be desired.

The memory device 720 may contain modules 730 that are executable by the processor(s) and data for the modules. A data store 722 may also be located in the memory device 720 for storing data related to the modules and other applications along with an operating system that is executable by the processor(s) 712.

The computing device 710 may further include or be in communication with a client device, which may include a display device. The client device may be available for an administrator to use in interfacing with the computing device 710, such as to review operation of a virtual computing instance, make improvements to machine learning models and so forth.

Various applications may be stored in the memory device 720 and may be executable by the processor(s) 712. Components or modules discussed in this description that may be implemented in the form of software using high programming level languages that are compiled, interpreted or executed using a hybrid of the methods.

The computing device 710 may also have access to I/O (input/output) devices 714 that are usable by the computing devices. An example of an I/O device 714 is a display screen that is available to display output from the computing devices. Other known I/O device may be used with the computing device as desired. Networking devices 716 and similar communication devices may be included in the computing device 710. The networking devices 716 may be wired or wireless networking devices 716 that connect to the internet, a LAN, WAN, or other computing network.

The components or modules that are shown as being stored in the memory device 720 may be executed by the processor 712. The term "executable" may mean a program file that is in a form that may be executed by a processor 712. For example, a program in a higher level language may be compiled into machine code in a format that may be loaded into a random access portion of the memory device 720 and executed by the processor 712, or source code may be loaded by another executable program and interpreted to generate instructions in a random access portion of the memory to be executed by a processor 712. The executable program may be stored in any portion or component of the memory device 720. For example, the memory device 720 may be random access memory (RAM), read only memory (ROM), flash memory, a solid state drive, memory card, a hard drive, optical disk, floppy disk, magnetic tape, or any other memory components.

The processor 712 may represent multiple processors and the memory 720 may represent multiple memory units that operate in parallel to the processing circuits. This may provide parallel processing channels for the processes and data in the system. The local interface may be used as a network to facilitate communication between any of the multiple processors and multiple memories. The local interface may use additional systems designed for coordinating communication such as load balancing, bulk data transfer, and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices. The modules may be passive or active, including agents operable to perform desired functions.

The technology described here may also be stored on a computer readable storage medium that includes volatile and non-volatile, removable and non-removable media implemented with any technology for the storage of information such as computer readable instructions, data structures, program modules, or other data. Computer readable storage media include, but is not limited to, RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which may be used to store the desired information and described technology. The computer readable storage medium may, for example, be in the form of a non-transitory computer readable storage medium. As used herein, the terms "medium" and "media" may be interchangeable with no intended distinction of singular or plural application unless otherwise explicitly stated. Thus, the terms "medium" and "media" may each connote singular and plural application.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media. The term computer readable media as used herein includes communication media.

It is noted that any of the distributed system implementations described above, or any of their components, may be implemented as one or more web services. In some implementations, a web service may be implemented by a software and/or hardware system designed to support interoperable machine-to-machine interaction over a network. A web service may have an interface described in a machine-processable format, such as the Web Services Description Language (WSDL). Other systems may interact with the web service in a manner prescribed by the description of the web service's interface. For example, the web service may define various operations that other systems may invoke, and may define a particular application programming interface (API) to which other systems may be expected to conform when requesting the various operations.

In various implementations, a web service may be requested or invoked through the use of a message that includes parameters and/or data associated with the web services request. Such a message may be formatted according to a particular markup language such as Extensible Markup Language (XML), and/or may be encapsulated using a protocol such as Simple Object Access Protocol (SOAP). To perform a web services request, a web services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some implementations, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

Reference was made to the examples illustrated in the drawings, and specific language was used herein to describe the same. It will nevertheless be understood that no limitation of the scope of the technology is thereby intended. Alterations and further modifications of the features illustrated herein, and additional applications of the examples as illustrated herein, which would occur to one skilled in the relevant art and having possession of this disclosure, are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. One skilled in the relevant art will recognize, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. A computer-implemented method, comprising:
   providing an account of the service provider environment access to a variety of types of physical security appliances and virtual security appliances in a service provider environment;
   receiving a request from the account, for a list of the variety of types of physical security appliances and virtual security appliances meeting criteria defined in the request;
   receiving a selection by the account, identifying a selected security appliance from a device farm including the variety of types of physical security appliances and virtual security appliances for use in a customer virtual infrastructure within the service provider environment;
   receiving configuration instructions to configure the selected security appliance, the configuration instructions including a security policy defined for the customer virtual infrastructure;
   allocating, in response to the selection by the account, the selected security appliance from the device farm at an edge location of the customer virtual infrastructure based on the configuration instructions; and configuring the selected security appliance to enforce the security policy.

2. The method of claim 1, wherein the edge location is between geographic service provider areas.

3. The method of claim 1, wherein the edge location is between virtual computing instances in the customer virtual infrastructure.

4. The method of claim 1, wherein the selected security appliance is a network firewall, an application firewall, an intrusion detector, an anti-malware system, a data loss prevention system, or a message gateway.

5. The method of claim 1, further comprising:
receiving a second selection of a second security appliance by the account;
provisioning the second security appliance in response to the second selection by the account for use in the customer virtual infrastructure;
providing a graphical user interface to enable receipt of the configuration instructions, including enabling dragging and dropping graphical representations of the selected security appliance and the second security appliance relative to other components of the customer virtual infrastructure shown in the graphical user interface to alter network traffic flow through the selected security appliance and the second security appliance; and
altering the network traffic flow in response to the configuration instructions received through the graphical user interface.

6. A computer-implemented method, comprising:
providing an account of the service provider environment access to a variety of types of physical security appliances in a service provider environment;
receiving a selection, made by the account, identifying a selected security appliance from a device farm having the variety of types of physical security appliances for use in a customer virtual infrastructure within the service provider environment;
allocating, in response to the selection made by the account, the selected security appliance from the device farm at an edge location of the customer virtual infrastructure; and
configuring the selected security appliance to enforce a security policy defined for the customer virtual infrastructure.

7. The method of claim 6, further comprising moving the selected security appliance to a second edge location in a network topology of the customer virtual infrastructure based on configuration instructions while maintaining a physical location of the selected security appliance.

8. The method of claim 6, further comprising using additional ones of the selected security appliance to enforce the security policy.

9. The method of claim 6, further comprising provisioning a second of the selected security appliance as a failover security appliance for a different geographic region.

10. The method of claim 6, further comprising provisioning the selected security appliance as a multi-tenant appliance to be shared by a plurality of customers.

11. The method of claim 6, wherein the selected security appliance is a plurality of security appliances each configured to manage separate security issues.

12. The method of claim 6, further comprising:
receiving a second selection, by the account, of a desired latency or attacks against which to defend, wherein the second selection is translated to a recommendation by the service provider environment for the selected security appliance.

13. The method of claim 6, further comprising:
replacing the selected security appliance with a virtual computing instance configured to enforce the security policy using software, and
sending a notification to a customer associated with the account of the use of the virtual computing instance.

14. The method of claim 6, further comprising:
providing access to the device farm with the variety of types of physical security appliances;
enabling the account to test the types of physical security appliances with varied configurations in the customer virtual infrastructure; and
providing results of the test for comparison of performance of the multiple types of physical security appliances.

15. The method of claim 6, further comprising receiving configuration instructions via an application programming interface (API) for configuring the selected security appliance to enforce the security policy.

16. The method of claim 6, wherein the selected security appliance comprises hardware in a production network underlying the service provider environment.

17. A computing system, comprising:
a device farm including a variety of types of physical security appliances in a service provider environment;
a plurality of computing devices in the service provider environment;
a customer virtual infrastructure executing in the service provider environment on the plurality of computing devices;
a digital marketplace configured to provide an account of the service provider environment with access to the device farm having the variety of types of physical security appliances and to receive a selection, made by the account, identifying a selected security appliance from the device farm for use in the customer virtual infrastructure;
a physical network connecting the customer virtual infrastructure via the plurality of computing devices to the selected security appliance; and
an interface to allocate, in response to the selection by the account, the selected security appliance from the device farm at an edge location of the customer virtual infrastructure and to configure the selected security appliance to enforce a security policy defined for the customer virtual infrastructure.

18. The computer system of claim 17, further comprising a validation engine configured to send a short burst of packets across the physical network through the selected security appliance to validate the selection and the security policy prior to deployment in the customer virtual infrastructure.

19. The computer system of claim 17, further comprising a security appliance test engine configured to virtualize the selected security appliance and test a performance of the selected security appliance in the customer virtual infrastructure.

20. The computer system of claim 17, wherein the edge location is a customer edge that is in a network topology of the customer virtual infrastructure.

* * * * *